(12) United States Patent
Kincaid et al.

(10) Patent No.: US 6,533,490 B2
(45) Date of Patent: Mar. 18, 2003

(54) ISOLATION BALL JOINT FOR STEERING AND SUSPENSION

(75) Inventors: Jeffrey Lee Kincaid, Clarkston, MI (US); Neil Alan Wasylewski, Farmington Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 135 days.

(21) Appl. No.: 09/755,536

(22) Filed: Jan. 5, 2001

(65) Prior Publication Data

US 2002/0102126 A1 Aug. 1, 2002

(51) Int. Cl.[7] ............................. F16C 11/00; F16D 1/12
(52) U.S. Cl. ...................................................... 403/133
(58) Field of Search ............................... 403/133, 132, 403/122, 143, 137, 142, 90, 134

(56) References Cited

U.S. PATENT DOCUMENTS

| | | |
|---|---|---|
| 1,883,020 A | 10/1932 | Shultz |
| 2,553,743 A | 5/1951 | Booth |
| 3,062,572 A | 11/1962 | Flumerfelt |
| 3,843,272 A | 10/1974 | Jorn ............................ 403/132 |
| 3,854,557 A | 12/1974 | Wilcox ................... 403/133 X |
| 4,034,996 A | 7/1977 | Manita et al. .......... 403/140 X |
| 4,235,558 A | 11/1980 | Snyder et al. .............. 403/130 |
| 4,386,869 A | 6/1983 | Smith .......................... 403/39 |
| 4,492,130 A | 1/1985 | Lamy et al. ............ 403/132 X |
| 4,576,499 A | 3/1986 | Smith .......................... 403/27 |
| 4,629,352 A | 12/1986 | Nemoto ...................... 403/128 |
| 4,695,182 A | 9/1987 | Wood, Jr. ................... 403/140 |
| 4,712,940 A | 12/1987 | Wood, Jr. ................... 403/133 |
| 4,875,794 A | 10/1989 | Kern, Jr. .................... 403/132 |
| 4,927,285 A | 5/1990 | Kotz et al. ................. 403/133 |
| 5,163,772 A | 11/1992 | Wood ......................... 403/133 |
| 5,178,482 A | 1/1993 | Wood ......................... 403/130 |
| 5,704,726 A | 1/1998 | Nemoto ...................... 403/133 |

*Primary Examiner*—Christopher J. Novosad
(74) *Attorney, Agent, or Firm*—Harness, Dickey & Pierce P.L.C.

(57) ABSTRACT

A ball joint assembly for pivotally interconnecting a first member and a second member includes a housing defining a cavity. The housing is adapted to be coupled to the first member. The ball joint also includes a ball stud having a ball segment retained in the cavity and a post segment adapted to be coupled to the second member. An elastomer is positioned within the cavity between the ball segment and the housing. The ball segment is rotatably coupled to the elastomer.

8 Claims, 2 Drawing Sheets

ISOLATION BALL JOINT FOR STEERING AND SUSPENSION

BACKGROUND OF THE INVENTION

1. Field of the Invention

The present invention relates to ball joints and, more particularly, to an isolating ball joint for steering and suspension systems with a ball stud and bearing coupled to a housing via an elastomeric damper.

2. Discussion of the Related Art

Automotive vehicles typically include suspension systems to absorb load inputs from the road to the vehicle. Also, steering systems enable the driver to direct the vehicle along a given path. Many vehicular steering and suspension systems utilize ball joints to interconnect components to accommodate changes in angularity. In general, most conventional ball joints include a ball stud, a ball socket, and a housing. Typically the ball stud is a forged metallic component with an elongated shank segment and a ball segment. The shank segment of the ball stud is connected to one suspension or steering component and the housing is fixed to another suspension or steering component. The ball segment of the ball stud is retained in a spherical cavity formed in the ball socket which, in turn, is mounted in the housing.

To facilitate transmission of force generated at the steering wheel, the ball stud, ball socket and housing are typically constructed from high strength materials such as steel. In some applications, a thin polymeric ball socket or spherical bearing is utilized to provide a lubricious wear surface to alleviate a service lubrication requirement. However, while the load transfer characteristics of these materials provides a structurally robust steering or suspension system, the load generated at the tire to road interface also has a relatively rigid path to follow back to the steering wheel. Accordingly, vibration generated by the tires, wheels and road are undesirably transmitted to the driver or vehicle occupant.

Accordingly, it is an object of the present invention to provide a ball joint for steering and suspension systems capable of isolating road load input from the vehicle occupants. It is another object of the present invention to provide an isolation ball joint for steering and suspension systems requiring minimal labor and processing costs.

SUMMARY OF THE INVENTION

The present invention includes a ball joint assembly to pivotally interconnect a first member and a second member. The second member includes a housing which defines a cavity. The housing is adapted to be coupled to the first member. The ball joint also includes a ball stud with a ball segment retained in the cavity and a post segment adapted to be coupled to the second member. An elastomer is positioned within the cavity between the ball segment and the housing. The ball segment is rotatably coupled to the elastomer.

Further objects, features and advantages of the invention will become apparent from a consideration of the following description and the appended claims when taken in connection with the accompanying drawings.

DETAILED DESCRIPTION OF THE PREFERRED EMBODIMENTS

In general, the present invention is directed toward a ball joint which accommodates relative angular movement between a pair of suspension or steering components such as, for example, a stabilizer bar and a control arm in a vehicle suspension or a steering knuckle and a tie rod arm. The ball and socket assembly of the present invention includes an elastomer adapted to isolate road load input from the vehicle driver or occupants. Thus, the ball joint of the present invention may be utilized with a wide variety of systems and it is not intended to be limited to the particular application described herein.

Figure 1:
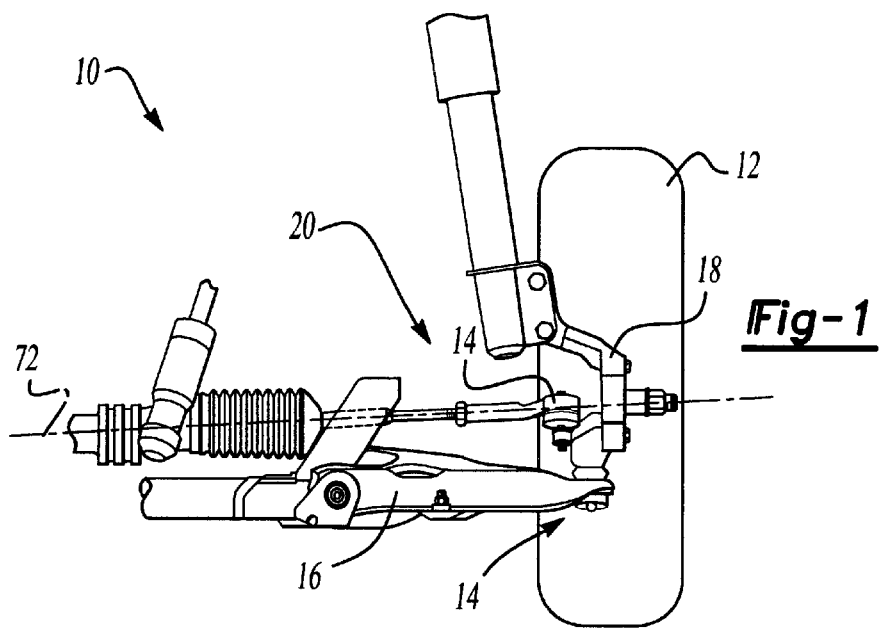
FIG. 1 is a fragmentary side view of an exemplary vehicle steering and suspension system including an isolation ball joint constructed in accordance with the teachings of the present invention.

With initial reference to FIG. 1, an exemplary vehicle suspension system 10 includes a steerable front wheel 12 to direct the vehicle along a predetermined path. The suspension system 10 includes a ball and socket assembly, hereinafter referred to as a ball joint 14. Ball joints are adapted to interconnect pairs of suspension members and accommodate relative angular motion between the pairs. Specifically, a lower control arm 16 is pivotally connected to a steering knuckle 18 by ball joint 14. Similarly, steering knuckle 18 is pivotally coupled to a tie rod assembly 20 via another similar ball joint 14. For clarity, only ball joint 14 used in conjunction with tie rod assembly 20 will be described in further detail.

Figure 2:
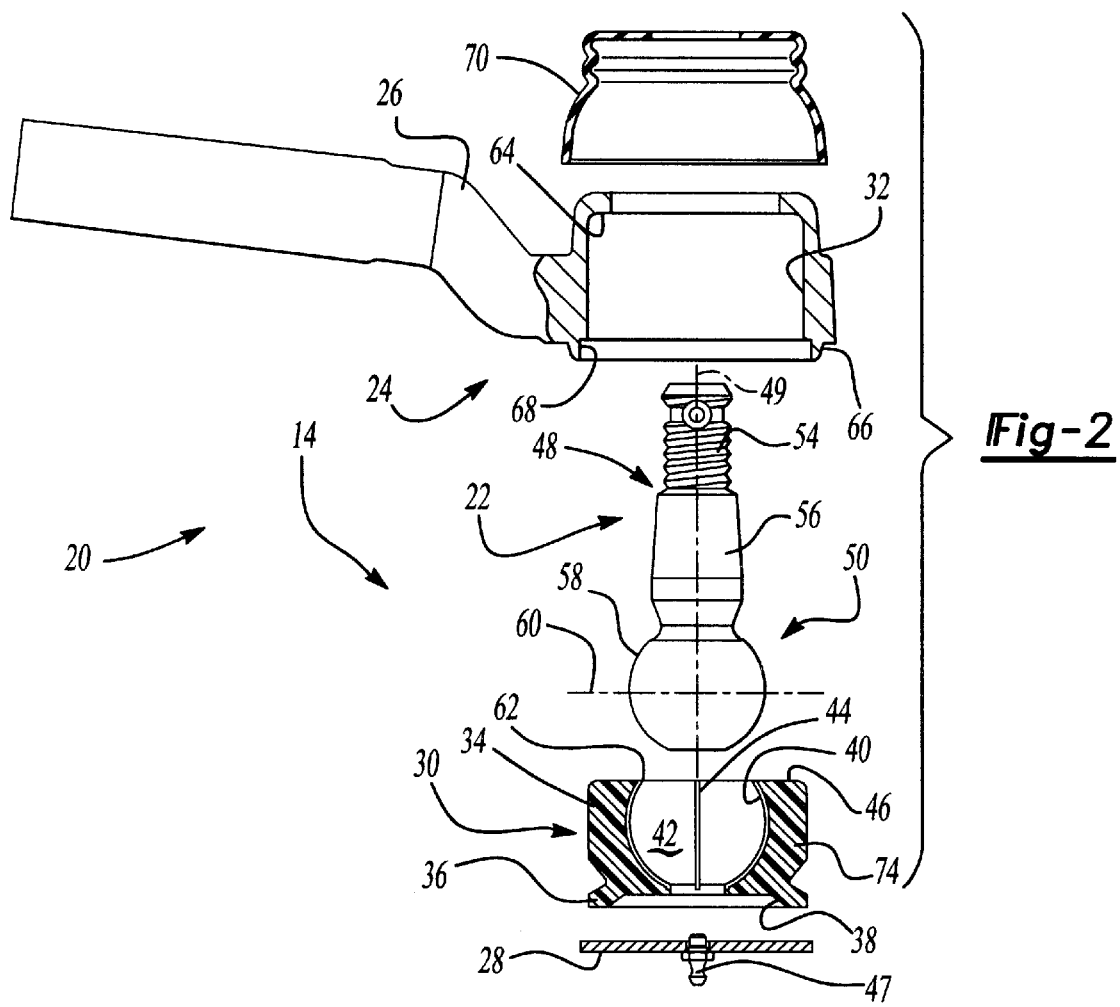
FIG. 2 is an exploded cross-sectional side view of a first embodiment of the preferred isolation ball joint.

With reference to FIG. 2, tie rod assembly 20 includes a ball stud 22 and a socket assembly 24. Socket assembly 24 is shown to include a housing 26, an end cap 28 enclosing one end of housing 26, and an elastomeric bearing 30 retained in an open-ended cavity 32 of housing 26. Elastomeric bearing 30 includes a generally circular cylindrical body 34 with an integrally formed flange 36. Flange 36 includes a recess 38 to store lubricant (not shown). Elastomeric bearing 30 also includes an inner wall 40 which defines a spherical socket 42. A plurality of longitudinal grease grooves 44 interrupt inner wall 40 and extend from recess 38 to an end face 46. Each grease groove 44 is radially spaced apart from one another at approximately 90° intervals. A grease fitting 47 is mounted to end cap 28 to provide a path for initial lubrication or later lubrication replenishment.

Ball stud 22 includes a shank segment 48 which defines an axis 49 and a head segment 50. Shank segment 48 includes an externally threaded portion 54 and a tapered portion 56 to engage with steering knuckle 18 (FIG. 1). Head segment 50 is spherically shaped to define an outer surface 58. Outer surface 58 is adapted to engage inner wall 40 of socket 42 in elastomeric bearing 30. Preferably, inner wall 40 defines a toroid which cooperates with spherically shaped outer surface 58 of head segment 50. Inner wall 40 is sized in an attempt to prevent locking or jamming of ball stud 22 within socket assembly 24. Accordingly, the contact points between outer surface 58 and inner wall 40 are offset from end face 46 of the elastomeric bearing 30. Those skilled in the art will appreciate that this particular arrangement is merely exemplary and that inner wall 40 may be spherically shaped to compliment outer surface 58 in its entirety.

At assembly, head segment 50 is disposed within socket 42 of elastomeric bearing 30. It should be appreciated that inner wall 40 extends beyond a hemispherical center line 60 of head segment 50. Thus, an opening 62 is present which has a diameter less than the diameter of head segment 50. Accordingly, body 34 elastically deforms as head segment 50 is pressed into socket 42. Once head segment 50 has been snap-fit into socket 42 ball stud 22 rotates freely within elastomeric bearing 30. At this time, the subassembly of ball stud 22 and elastomeric bearing 30 is disposed within open-ended cavity 32 of housing 26.

Housing 26 includes a stop face 64 which engages end face 46 of elastomeric bearing 30 to limit its axial travel. Housing 26 further includes a lip 66 which defines a counter bore 68 in communication with open-ended cavity 32. Preferably, flange 36 is compressed by end cap 28 while lip 66 is mechanically deformed into contact with end cap 28 to pre-load elastomeric bearing 30 into contact with stop face 64. A boot 70 is sealingly engaged with housing 26 and shank segment 48 to protect ball joint 14 from contamination.

Once assembled to a vehicle, tie rod assembly 20 functions to transmit load primarily along a longitudinal axis 72 (FIG. 1). As such, load is transferred from housing 26 to ball stud 22 via elastomeric bearing 30. In particular, a wall 74 of cylindrical body 34 is compressed a distance corresponding to the load transmitted and thickness of wall 74. Therefore, depending on the class of fit between head segment 50 and inner wall 40, thickness of wall 74 of cylindrical body 34, and the mechanical properties of elastomeric bearing 30, certain energy absorption, damping, and transmissability characteristics are imparted to ball joint 14.

Accordingly, a method of providing an isolation ball joint for steering and suspension assemblies includes selecting a ball stud to meet a certain load carrying capacity; determining the magnitude and frequency of undesirable feedback to be isolated; and selecting an elastomeric material and determining the thickness of elastomeric bearing 30. The step of selecting a ball stud is driven by the predicted input load, preferred material from which the ball stud is constructed, and projected life of ball joint 14. Preferably, ball stud 22 is constructed from a steel alloy with a shank segment and a head segment proportional to the load to be carried.

The step of determining the magnitude and frequency of the undesirable feedback loads may be accomplished by performing analytical simulations using the geometrical specifications of the proposed vehicle. An empirical study of the actual vehicle may also be conducted using strain gages and accelerometers located on the suspension or steering components to be interconnected.

Selection of the elastomeric material is primarily based on the material characteristics of natural frequency, stiffness and damping. Basically, a softer material provides more deflection. This increases the amount of energy converted to heat during compression and release. The natural frequency determines at which periodic input frequency the system effectively dampens a periodic input. The lower the hardness of the elastomeric bearing, the lower the natural frequency.

Finally, the step of determining the thickness of the elastomeric material is performed. As the quantity of material positioned in the load path increases, the energy absorption capability increases. Therefore, larger diameter elastomeric bearings assist in effectively isolating vibrational transmissions. Unfortunately, component weight and size are often limited by cost and packaging concerns. Upon completion of the aforementioned steps, ball joint 14 is assembled by placing the elastomer between ball stud 22 and housing 26 to isolate undesirable vibrations to prevent transfer to a vehicle occupant.

Figure 3:
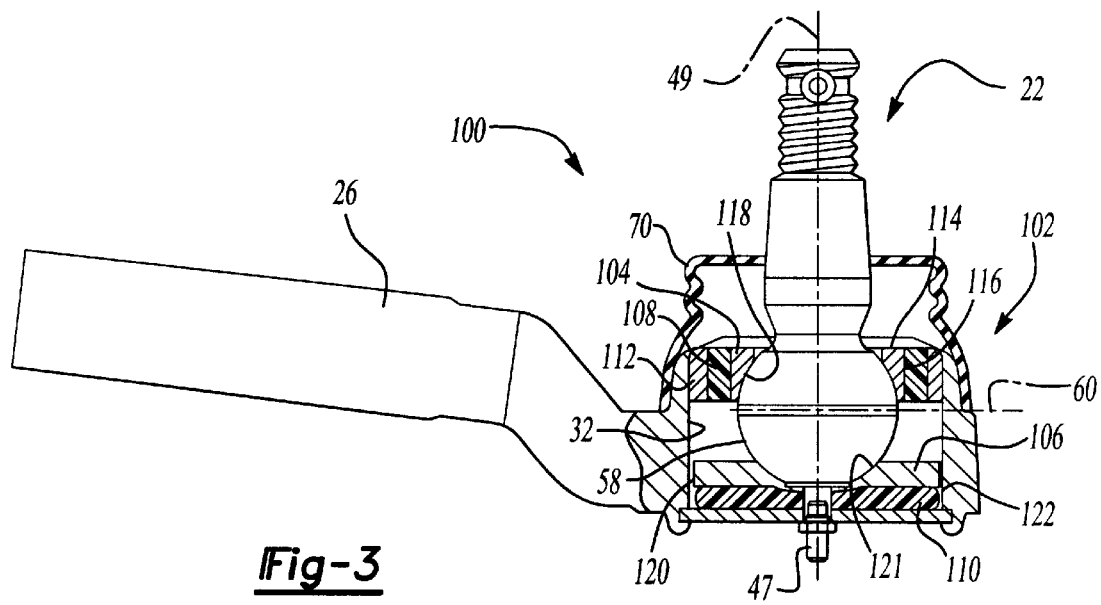
FIG. 3 is a cross-sectional side view of a second embodiment of the preferred isolation ball joint.

With reference to FIG. 3, a second embodiment of the isolating ball joint for steering and suspension systems is generally identified at reference numeral 100. It should be appreciated that the second embodiment 100 includes many components substantially similar to the components used to construct the first embodiment. Accordingly, like elements will retain their original reference numerals.

Ball joint 100 includes a two-piece bearing assembly 102 having a ball seat 104 and a spring seat 106. Ball joint 100 further includes a first elastomer 108 to isolate ball seat 104 from housing 26. A second elastomer 110 is present to isolate spring seat 106 from housing 26. FIG. 3 depicts an optional cage 112 positioned within open-ended cavity 32 between first elastomer 108 and housing 26. One skilled in the art will appreciate that first elastomer 108 may be integrally molded to cage 112 to provide structural stability to first elastomer 108. The cage assists to maintain the desired shape of first elastomer 108 during installation into open-ended cavity 32. Additionally, cage 112 compresses first elastomer 108 against ball seat 104 to produce a desirable preload. However, it is contemplated that first elastomer 108 may be directly molded to ball seat 104 or separately installed without the use of cage 112.

Ball seat 104 is a generally circular cylindrical member with an end face 114, an outer surface 116 and a guide surface 118. Guide surface 118 is generally spherically shaped to compliment outer surface 58 of ball stud 22.

Spring seat 106 is a generally circular cylindrically shaped member having an outer surface 120, a spherically shaped contact surface 121 formed at one end and a thrust face 122 formed at the other end. Spring seat 106 is sized such that outer surface 120 may be disposed within open-ended cavity 32 without touching housing 26. Accordingly, spring seat 106 provides a degree of freedom for alignment of contact surface 121 with outer surface 58 of head segment 50. Preferably, spring seat 106 is preloaded against head segment 50 by compressing second elastomer 110 with end cap 28 and deforming lip 66 while second elastomer 110 is compressed. It should also be appreciated that frictional losses between ball stud 22 and spring seat 106 are minimized by employing the aforementioned construction. Specifically, spring seat 106 encompasses head segment 50 in a limited manner extending toward a hemispherical center line 60 a short distance as compared to ball seat 104. Accordingly, a maximum friction radius 124 defined by contact between contact surface 121 of spring seat 106 and ball stud 22 is substantially shorter than a maximum friction radius 126 defined by guide surface 118 and ball stud 22.

Figure 4:
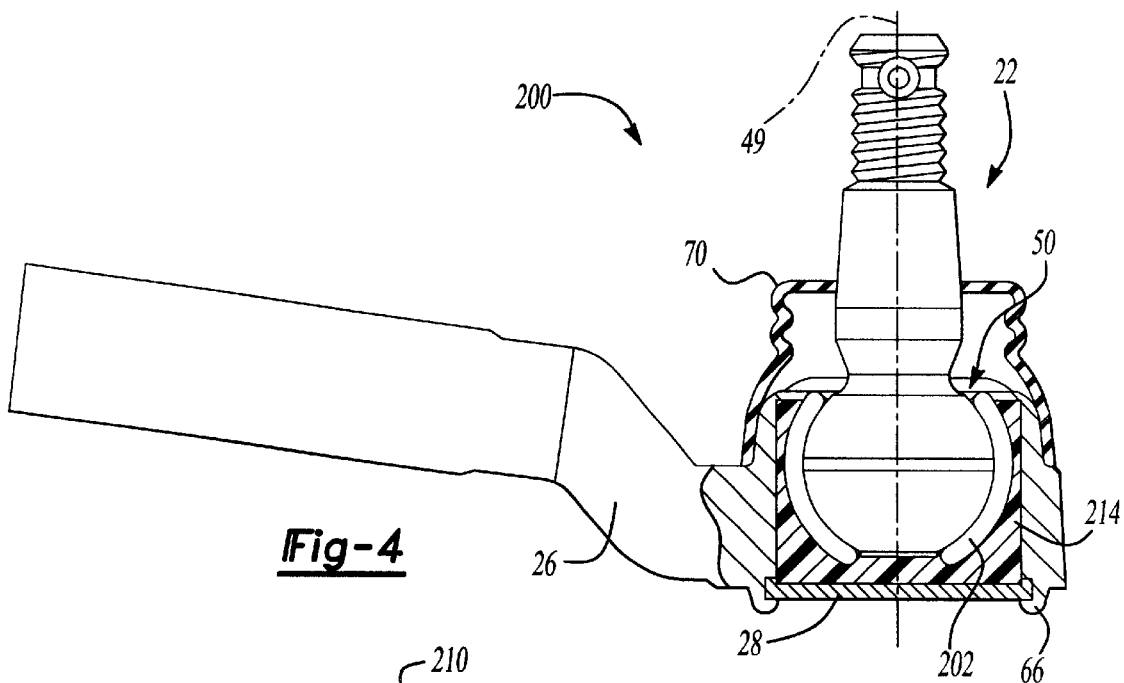
FIG. 4 is a cross-sectional side view of a third embodiment of the preferred isolation ball joint.

With reference to FIG. 4, a third embodiment of the isolation ball joint is depicted at reference numeral 200. Third embodiment 200 includes many components substantially similar to those described in the first and second embodiments. Accordingly, similar elements are identified with like numerals.

Ball joint 200 is a maintenance free design which eliminates the need for periodic lubrication through an external fitting such as grease fitting 47 shown in FIGS. 2 and 3. Accordingly, end cap 28 does not include an aperture to receive grease and grease fitting 47. Ball joint 200 includes a polymeric bearing 202 preferably constructed from a high strength moldable material exhibiting a low coefficient of friction such as acetal. It should be appreciated that other polymeric bearing materials may be utilized without departing from the scope of the present invention.

Figure 5:
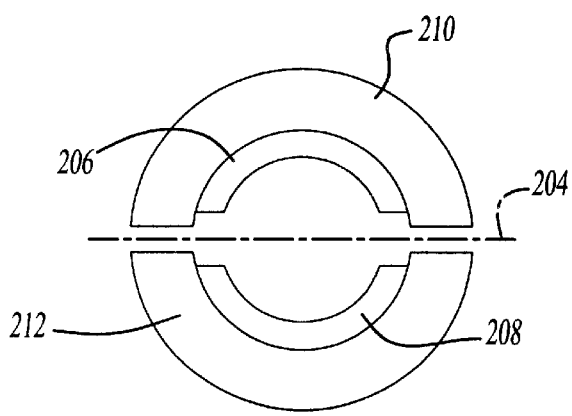
FIG. 5 is a top view of bearing halves constructed in accordance with the teachings of an embodiment of the present invention.

As shown in FIG. 5, polymeric bearing 202 is preferably split vertically along a plane defined by axis 49 (FIG. 4) and line 204 into a first bearing half 206 and a second bearing half 208. In one embodiment, first bearing half 206 is integrally molded with elastomer 210. Second bearing half 208 is molded with elastomer 212 prior to positioning about head segment 50. Thus, two segments are formed. It should be appreciated that the segments need not be divided along line 204 but may be divided in any manner suitable to install head segment 50 within polymeric bearing 202.

Alternatively, each of the first and second bearing halves are positioned about head segment 50 of ball stud 22 and subsequently inserted into a mold. An elastomer 214 (FIG. 4) is injected into the mold to encapsulate head segment 50, first bearing half 206 and second bearing half 208. One skilled in the art will appreciate that such an over-molding process may be controlled to fix first and second bearing halves 206 and 208 relative to elastomer 214 while still enabling ball stud 22 to articulate freely. Once ball stud 22, polymeric bearing 202 and elastomer 214 have been either over-molded or preassembled, the subassembly is disposed within open-ended cavity 32 as shown in FIG. 4. End cap 28 is disposed within counter bore 68 and further displaced to compress elastomer 214 while lip 66 of housing 26 is deformed to complete the assembly.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A ball joint assembly for pivotally interconnecting a first member and a second member, the ball joint assembly comprising:

a housing defining a cavity, said housing adapted to be coupled to the first member;

a ball stud having a ball segment retained in said cavity and a post segment adapted to be coupled to the second member;

a first bearing seat having a guide surface engaging a first portion of said ball segment;

a second bearing seat having a contact surface engaging a second portion of said ball segment;

a first elastomer positioned within said cavity between said first bearing seat and said housing, said first elastomer providing a load path between said first bearing seat and said housing;

a generally circular cylindrical cage encompassing said first elastomer; and a second elastomer positioned within said cavity between said second bearing seat and said housing, said second elastomer providing a load path between said second bearing seat and said housing.

2. The ball joint of claim 1 wherein said first elastomer is integrally bonded to said first bearing seat and said cage.

3. The ball joint of claim 1 wherein said cage engages said cavity.

4. A ball joint assembly for pivotally interconnecting a first member and a second member, the ball joint assembly comprising:

a housing defining a cavity, said housing adapted to be coupled to the first member;

a ball stud having a ball segment retained in said cavity and a post segment adapted to be coupled to the second member;

a first bearing seat having a guide surface engaging a first portion of said ball segment;

a second bearing seat having a contact surface engaging a second portion of said ball segment, wherein said guide surface and said ball stud define a friction radius substantially longer than a friction radius defined by said contact surface and said ball stud;

a first elastomer positioned within said cavity between said first bearing seat and said housing, said first elastomer providing a load path between said first bearing seat and said housing; and a second elastomer positioned within said cavity between said second bearing seat and said housing, said second elastomer providing a load path between said second bearing seat and said housing.

5. A ball joint assembly for pivotally interconnecting a first member and a second member, the ball joint assembly comprising:

a housing defining a cavity, said housing adapted to be coupled to the first member;

a ball stud having a ball segment retained in said cavity and a post segment adapted to be coupled to the second member;

a first bearing seat having a guide surface engaging a first portion of said ball segment;

a second bearing seat having a contact surface engaging a second portion of said ball segment;

a first elastomer positioned within said cavity between said first bearing seat and said housing, said first elastomer providing a load path between said first bearing seat and said housing, wherein said first elastomer is a generally hollow circular cylinder having an inner surface engaging said first bearing seat and an outer surface coupled to said housing; and a second elastomer positioned within said cavity between said second bearing seat and said housing, said second elastomer providing a load path between said second bearing seat and said housing.

6. A method of isolating vibrations which are transferred to a vehicle occupant, the vehicle including a first member pivotally coupled to a second member, the method comprising the steps of:

providing a housing adapted to be coupled to the first member;

selecting a ball stud, said ball stud adapted to be coupled to the second member;

determining a magnitude and a frequency of vibration to isolate;

determining a thickness of an elastomeric material based on said magnitude and frequency of said vibration; and placing said elastomeric material between said ball stud and said housing to isolate the vibrations.

7. The method of claim 6 further including the step of molding a bearing seat within said elastomeric material, said bearing seat engaging said ball stud.

8. The method of claim 6 wherein the step of placing said elastomeric material between said ball stud and said housing includes snap fitting said ball stud in a cavity defined by said elastomeric material.

* * * * *